INVENTOR
EDWARD F. MAC NICHOL, JR.

BY
ATTORNEY

INVENTOR
EDWARD F. MAC NICHOL, JR.

BY

ATTORNEY

Patented Dec. 11, 1951

2,578,256

UNITED STATES PATENT OFFICE 2,578,256

COINCIDENCE-INTEGRATING CIRCUIT

Edward F. MacNichol, Jr., Hamilton, Mass., assignor, by mesne assignments, to the United States of America as represented by the Secretary of the Navy Application April 24, 1946, Serial No. 664,460

9 Claims. (Cl. 250—27)

This invention relates to coincidence and difference integrating circuits and more particularly to coincidence and difference integrating circuits combined for use in automatic radar range tracking systems.

In automatic range tracking systems it is necessary to produce a voltage output that varies proportionally to the range of the radar target that is being tracked. One type of circuit known as the double gate method for producing this effect depends upon the generation of two voltage gates, the leading edge of one gate corresponding in time phase to the trailing edge of the other gate. By the term voltage gate as used here and hereinafter in this specification is meant a square voltage pulse used primarily to enable or block succeeding circuit components. In the double gate circuit the two voltage gates may be varied in time until their common edge corresponds to the center of the radar target return being tracked. A voltage must be produced that maintains the above mentioned relationship between the voltage gates and the video pulse which is the received radar target return. The voltage is then proportional to the range of the radar target and hence is the voltage required for automatic range tracking.

In this embodiment of the invention a circuit is presented that measures the area of overlap between the two voltage gates and the video pulse from the target that is being tracked and integrates the difference in overlap to produce the control tracking voltage. This control voltage is fed back to the voltage gate generators to vary the time position of the voltage gates so that their common edge corresponds to the center of the video pulse. The control voltage is therefore an accurate indication of the range of the radar target and is therefore the desired tracking voltage. This invention accomplishes the above desired object with a more economical use of parts than the circuits previously used in the art. Although the use of this invention has been described with particular regard to its application to automatic radar range tracking, it is not to be inferred that the invention should be limited in any way to this application. The circuit may be adapted for other uses such as its use with sine wave tracking where the voltage gates are accurately positioned on a zero voltage point of the sine wave.

A primary object of this invention is to generally improve radar range tracking devices.

Another object of this invention is to provide a simplified circuit for accomplishing the functions of coincidence determination and difference integration.

A further object is to provide a circuit adaptable for sine wave tracking.

These and other objects of this invention will be apparent from the following description when taken with the accompanying drawings in which.

Figure 1:
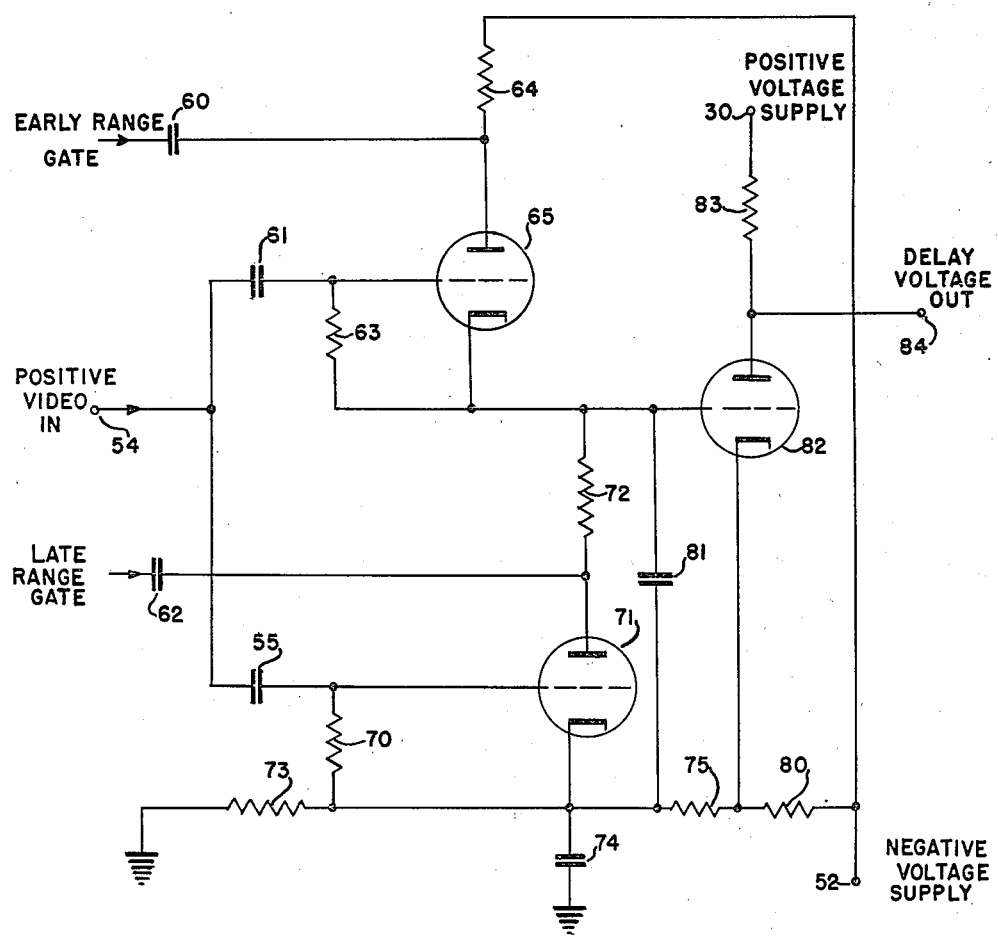
Fig. 1 is a schematic diagram of one form of the invention.

Referring to the drawings and more particularly to Fig. 1, video input terminal 54 is coupled through condenser 61 to the grid of triode electron tube 65, and through condenser 55 to the grid of triode electron tube 71. Resistor 63 is connected between the grid and cathode of triode 65, and resistor 70 is similarly connected to triode 71. The plate of triode 65 connects to the negative voltage supply at terminal 52 through plate load resistor 64, and the cathode of triode 65 is connected to the plate of triode 71 through its plate load resistor 72. The cathode of triode 71 connects to ground through the parallel combination of resistor 73 and condenser 74, and to the negative voltage supply at terminal 52 through the series combination of resistor 75 and resistor 80. An early range voltage gate is coupled to the plate of triode 65 through condenser 60 and a late range voltage gate is coupled to the plate of triode 71 through condenser 62. The cathode of triode 65 and the grid of triode electron tube 82 are connected together and to the cathode of triode 71 through condenser 81. The plate of triode 82 connects to the positive voltage supply at terminal 39 through resistor 83 and the cathode is connected to the junction of resistors 75 and 80. An output voltage that is proportional to range when this circuit is used with an automatic range tracking system is produced at the plate of triode 82 and made available at delay voltage output terminal 84.

In the operation of the coincidence and difference integrating circuit as shown in Fig. 1, when the range voltage gates are not present, triode 65 is in a non-conducting state because the plate is held negative with respect to the cathode due to the plate return to the negative voltage supply at terminal 52. Triode 71 is also in a non-conducting state due to fixed bias that holds the cathode slightly positive with respect to the plate. The early range voltage gate applied to the plate of triode 65 and the late range voltage gate introduced to the plate of triode 71 are so timed that the trailing edge of the early voltage gate coincides in time with the leading edge of the late voltage gate. The positive radar video pulse from the target being tracked is simultaneously applied to the grids of triodes 65 and 71. The charge flowing through triode 71 when it is conducting tends to charge condenser 81 with a negative charge on the condenser plate connected to the grid of triode 82, and the charge flowing through triode 65 tends to remove this charge from condenser 81. When the video pulse appears in time phase so that it overlaps the early and late voltage gates by the same amount, the charge flowing through triode 71 and triode 65 are equal and therefore the average charge on condenser 81 is not changed.

If the video pulse tends to become displaced from this position relative to the voltage gates so that the area of overlap between the video pulse and the early voltage gate is greater than the area of overlap between the video pulse and the late voltage gate, the charge flowing through triode 65 increases in proportion to the change in area of overlap between the early range gate and the video pulse; and the charge flowing through triode 71 decreases in proportion to the change in area of overlap between the late range gate and the video pulse. This action causes the charge on condenser 81 to change so that the grid of triode 82 becomes more positive. The voltage output from the plate of triode 82 becomes less positive due to the video pulse occurring early in time so that overlap with the early voltage gate is greater than overlap with the late voltage gate. If the video pulse shifts relative to the voltage gates so that the overlap with the late voltage gate is the greater, the charge flowing through triode 71 is greater than that through triode 65 causing the charge on condenser 81 to change so that the grid of triode 82 becomes less positive and the output voltage at terminal 84 becomes more positive.

Figure 2:
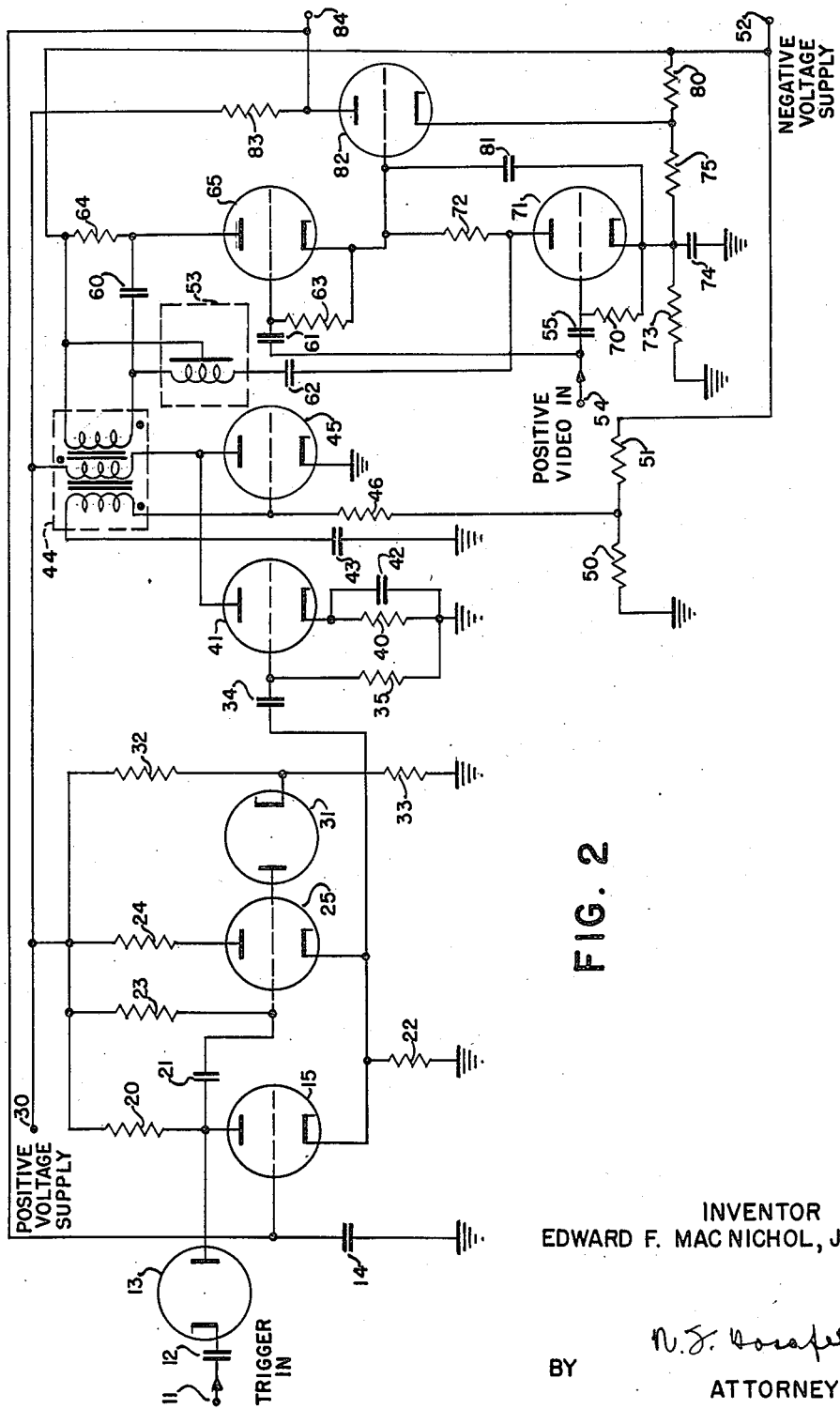
Fig. 2 is a schematic diagram showing the application of this invention in an automatic radar range tracking unit.

Referring to Fig. 2, when the coincidence and difference integrating circuit as described above is used in an automatic range tracking circuit, the voltage output from the plate of triode 82 is fed into the grid of triode electron tube 15, the normally non-conducting tube in a delay multivibrator. Triode electron tube 25, the normally conducting tube of the multivibrator has its plate connected to the plate voltage supply at terminal 30 through resistor 24 and its cathode tied to the cathode of triode 15 and then to ground through resistor 22. Triode 15 has its plate connected to the plate voltage supply at terminal 30 through resistor 20 and also to the grid of triode 25 by condenser 21. To maintain triode 25 in the conducting region its grid is returned to the plate voltage supply at terminal 30 through resistor 23. The grid of triode 25 is also connected through diode electron tube 31 to the voltage divider consisting of resistors 32 and 33 connected between terminal 30 and ground; the plate of diode 31 being connected to the grid of triode 25, and the cathode to the junction of resistors 32 and 33. The delay multivibrator is triggered by a negative trigger at terminal 11 that is coupled through series condenser 12 and diode electron tube 13 to the plate of triode 15. The variable length voltage gate output is taken from the cathode of triodes 15 and 25 and fed through the peaking circuit consisting of series condenser 34 and shunt resistor 35 to the grid of triode electron tube 41. Triode 41 is biased by resistance 40 and condenser 42 connected in parallel between its cathode and ground and serves as a current amplifier. The plate of triode 41 is connected to the plate of triode electron tube 45 and then through the primary of transformer 44 to the plate voltage supply at terminal 30. Triode 45 is connected as a blocking oscillator having its cathode grounded and its grid biased by being connected through resistor 46 to the junction of resistors 50 and 51. Resistors 50 and 51 are connected as a voltage divider between the negative voltage supply at terminal 52 and ground. The regenerative coupling between the plate and grid of triode 45 and the blocking action is accomplished by connecting the grid through the secondary of transformer 44 and condenser 43 to ground. Considering the combined action of triodes 41 and 45, the peaking circuit in the control-grid cathode circuit of triode 41 produces a negative pulse at the leading edge of the voltage gate from the delay multivibrator, and a positive pulse at the variable trailing edge. As triode 41 is heavily biased by cathode bias, the negative pulse on the control grid has very little effect upon the plate current of triode 41. The positive voltage pulse when applied to the grid of triode 41 causes the plate current of triode 41 to increase sharply producing a large induced voltage across transformer 44, triggering the blocking oscillator and causing it to go through its cycle of operation. The voltage gate output from the blocking oscillator is obtained from a tertiary winding on transformer 44 with the leading edge corresponding in time to the trailing edge of the voltage gate output from the delay multivibrator. The output from the blocking oscillator is coupled through condenser 60 to the plate of triode 65 and serves as the early voltage gate previously mentioned in the description of the coincidence and difference integrating circuit. The blocking oscillator voltage gate output is also passed through delay line 53, having a fixed delay equal to the gate length, and through condenser 62 to the plate of triode 71. This delayed voltage gate comprises the previously mentioned late voltage gate.

In the operation of the entire circuit, when the video pulse overlaps the early voltage gate more than the late, the voltage output from triode 82 becomes less positive, as previously described, causing the voltage on the grid of triode 15 to decrease which decreases the length of the voltage gate output from the delay multivibrator. The trailing edge of this voltage gate appearing earlier in time phase causes the blocking oscillator to produce the voltage gates earlier and hence to restore the original time relation between the video pulse and the voltage gates. In such a circuit the voltage obtained at the plate of triode 82 and terminal 84 will be proportional to the range of the target producing the radar video pulse.

This invention need not be limited to the details shown in the foregoing specification which are considered to be illustrative of one embodiment thereof. The scope of the invention is defined by the appended claims.

What is claimed is:

1. A combined coincidence and difference integrating circuit comprising first and second electron tubes each having at least a cathode, an anode, and a control grid, means to apply a first voltage gate to the plate of said first electron tube, means to apply a second voltage gate to the plate of said second electron tube, said first and second voltage gates having the same time duration, the trailing edge of said first voltage gate coinciding in time phase to the leading edge of said second voltage gate, means to apply a video pulse input simultaneously to said first and second electron tubes, a condenser, means for applying said voltage gates to said condenser through said second and first electron tubes according to the relative time relation between said video pulse and said second and first voltage gates, and means to obtain a voltage output from said condenser without disturbing the state of charge of said condenser.

2. A combined coincidence and difference integrating circuit comprising, first and second electron tubes each having at least a cathode, an anode, and a control grid, a voltage gate source supplying first and second positive voltage gates having the same time duration, the trailing edge of said first voltage gate coinciding in time phase with the leading edge of said second voltage gate, said first voltage gate being applied to the plate of said first electron tube, and said second voltage gate to the plate of said second electron tube, means to apply a positive video pulse input simultaneously to said first and second electron tubes, a condenser, means for applying said voltage gates to said condenser through said first and second electron tubes according to the time relation between said first and second voltage gates and said video pulse, means to prevent the charge on said condenser from being changed by voltage disturbances in the video input circuit when said first and second voltage gates are not present, and means to obtain a voltage output according to the charge on said condenser without disturbing the charge on said condenser.

3. A combined coincidence and difference integrating circuit comprising, first and second electron tubes each having at least a cathode, an anode, and a control grid, a negative voltage source, said first electron tube being held normally non-conducting by returning its plate to said negative voltage source, said second electron tube being held normally non-conducting by fixed bias in the cathode-anode circuit, a voltage gate source supplying a first and second positive voltage gate each having the same time duration, the trailing edge of said first voltage gate coinciding in time phase with the leading edge of said second voltage gate, said first voltage gate being applied to the plate of said first electron tube and said second voltage gate to the plate of said second electron tube, an input circuit adapted to feed a positive video pulse input simultaneously to the grids of said first and second electron tubes, a condenser connected between the cathode of said first electron tube and the cathode of said second electron tube, the charge flowing through either of said first and second electron tubes being proportional to the overlap between said voltage gates applied to the plates and said video pulse applied to the grids of each of said first and second electron tubes, the charge on said condenser changing according to the relative time phase of said video pulse and said first and second voltage gates, and means for obtaining a voltage output from said condenser without disturbing the state of charge on said condenser.

4. A combined coincidence and difference integrating circuit comprising first and second electron tubes each having at least a cathode, an anode, and a control grid, a voltage gate source supplying a first and second positive voltage gate each having the same time duration, the trailing edge of said first voltage gate coinciding in time phase with the leading edge of said second voltage gate, said first voltage gate applied to the plate of said first electron tube and said second voltage gate, to the plate of said second electron tube, said first and second electron tubes being maintained non-conducting by fixed bias when said voltage gates are not present, an input circuit adapted to feed a positive video pulse input simultaneously to the grids of said first and second electron tubes, a condenser connected between the cathode of said first electron tube and the cathode of said second electron tube, the charge flowing through said first and second electron tubes being proportional to the overlap between said first and second voltage gates applied to the plates and said positive video pulses applied to the grids of said first and second electron tubes, the charge on said condenser changing according to the relative time phase of said video pulse and said first and second voltage gates, and a third electron tube having at least a cathode, an anode, and a control grid, adapted to obtain its grid voltage from the voltage across said condenser and to have a voltage output from its plate that varies according to the charge on said condenser.

5. An electronic target tracking circuit responsive to synchronizing pulses and video pulses reflected from said target comprising, first and second electron tubes, means for applying said video pulses simultaneously to said first and second tubes, means for generating a first gating pulse of predetermined duration, means for generating a second gating pulse also of said predetermined duration, means for applying said first gating pulse to said first tube, means for applying said second gating pulse to said second tube, and means responsive to the relative coincidence of said gating pulse and said video pulse in said first tube as compared to the relative coincidence of said gating and said video pulse in said second tube for controlling the time of occurrence of said gating pulses.

6. An electronic target tracking circuit responsive to synchronizing pulses and video pulses reflected from said target comprising, first and second electron tubes, means for applying said video pulses simultaneously to said first and second electron tubes, means for generating first and second gating pulses of predetermined equal durations in response to said synchronizing pulses, means for applying said first gating pulse to said first electron tube, means for applying said second gating pulse to said second electron tube, and means responsive to the relative coincidence of said video and gating pulses in said first and second electron tubes for controlling said means for generating said gating pulses.

7. Apparatus as in claim 6 wherein each of said first and second electron tubes has at least an anode, a cathode and a grid, said means for applying said video pulses being connected to said grids, said means for applying said first gating pulse being connected to the anode of said first electron tube and said means for applying said second gating pulse being connected to the anode of said second electron tube.

8. Apparatus as in claim 7 including a condenser connected between the cathodes of said first and said second electron tubes, conduction through said tubes thereby varying the charge on said condenser, and a third electron tube having at least a grid, said grid also being connected to said condenser and deriving operating bias therefrom.

9. An electronic target tracking circuit responsive to synchronizing pulses and video pulses reflected from said target comprising, a multivibrator responsive to said synchronizing pulses for generating voltage pulses, a blocking oscillator connected to said multivibrator and responsive in operation to the output thereof, said blocking oscillator producing gating pulses of predetermined duration and in close sequence, a first electron tube having at least a cathode, an anode and a grid, said first tube being connected to and responsive in conduction to the output of said blocking oscillator, a delay line having a delay equal to said predetermined duration and energized by the output of said blocking oscillator, a second electron tube having at least a cathode, an anode and a grid, said second tube being connected to said delay line and responsive in conduction to said blocking oscillator output as modified by said delay line, means for applying said video pulses simultaneously to the grids of said first and said second electron tubes to further control the conduction therein, a condenser connected between the cathodes of said first and said second electron tubes and chargeable in response to the conduction of said first and said second electron tubes, and a third electron tube for controlling said multivibrator, said third electron tube being connected to said condenser and deriving its bias from said condenser.

EDWARD F. MacNICHOL, JR.

REFERENCES CITED

The following references are of record in the file of this patent:

UNITED STATES PATENTS

| Number | Name | Date |
|---|---|---|
| 2,412,632 | Sanders | Dec. 17, 1946 |